US009303748B2

(12) United States Patent
Creager

(10) Patent No.: US 9,303,748 B2
(45) Date of Patent: Apr. 5, 2016

(54) COLLAPSIBLE CLUTCHING DIFFERENTIAL

(71) Applicant: Eaton Corporation, Cleveland, OH (US)

(72) Inventor: Christopher Wayne Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 148 days.

(21) Appl. No.: 14/084,024

(22) Filed: Nov. 19, 2013

(65) Prior Publication Data

US 2014/0141920 A1 May 22, 2014

Related U.S. Application Data

(60) Provisional application No. 61/727,990, filed on Nov. 19, 2012.

(51) Int. Cl.
*F16H 48/19* (2012.01)
*F16H 48/20* (2012.01)

(52) U.S. Cl.
CPC .......... *F16H 48/19* (2013.01); *F16H 2048/207* (2013.01); *Y10T 29/49863* (2015.01)

(58) Field of Classification Search
CPC ..... F16H 48/08; F16H 2048/085; F16H 1/14; F16H 1/222
USPC ................................. 74/650, 665 F
See application file for complete search history.

(56) References Cited

U.S. PATENT DOCUMENTS

| 3,253,483 A | 5/1966 | McCaw |
| 3,264,900 A | 8/1966 | Hartupee |
| 3,611,833 A | 10/1971 | Baremor |
| 3,886,813 A | 6/1975 | Baremor |
| 3,906,812 A | 9/1975 | Kagata |
| 4,136,582 A | 1/1979 | Boor |
| 4,498,355 A | 2/1985 | Schou |
| 4,735,108 A | 4/1988 | Teraoka et al. |

(Continued)

FOREIGN PATENT DOCUMENTS

| EP | 0 091 747 A2 | 10/1983 |
| EP | 0 683 333 A1 | 11/1995 |

(Continued)

OTHER PUBLICATIONS

U.S. Appl. No. 14/203,816, filed Mar. 11, 2014 entitled "Inboard Spring Arrangement for a Clutch Actuated Differential".

*Primary Examiner* — Ha D Ho
(74) *Attorney, Agent, or Firm* — Merchant & Gould P.C.

(57) ABSTRACT

A collapsible clutching differential is for use in a drive train of a vehicle to control torque thereof. The drive train includes at least one rotating member defining an axis of rotation of the rotating member; a housing operatively supported in driven relationship with respect to a remainder of the drive train, adapted to rotate about the axis, and defining a cavity of the housing into which the rotating member extends; and at least one cross-pin mounted for rotation with the housing. The differential includes a pair of castellated side gears disposed in the cavity of the housing, supported for rotation about the axis relative to the housing, and having a torque-transmitting connection to the rotating member. The castellated side gears are adapted to be spaced from each other and collapse upon themselves such that the differential collapses upon itself.

16 Claims, 6 Drawing Sheets

(56) References Cited

U.S. PATENT DOCUMENTS

| | | |
|---|---|---|
| 4,754,661 A | 7/1988 | Barnett |
| 4,845,831 A | 7/1989 | Schou |
| 4,865,173 A | 9/1989 | Leigh-Monstevens et al. |
| 4,903,809 A | 2/1990 | Kiblawi et al. |
| 4,939,953 A | 7/1990 | Yasui |
| 4,978,329 A | 12/1990 | Yasui et al. |
| 5,019,021 A | 5/1991 | Janson |
| 5,413,015 A | 5/1995 | Zentmyer |
| 5,441,131 A | 8/1995 | Mayer et al. |
| 5,603,397 A | 2/1997 | Meyers |
| 5,715,733 A | 2/1998 | Dissett |
| 5,727,430 A | 3/1998 | Valente |
| 5,823,908 A | 10/1998 | Stefanek |
| 5,901,618 A | 5/1999 | Tyson et al. |
| 5,971,120 A | 10/1999 | Bessemer et al. |
| 6,062,105 A | 5/2000 | Tyson et al. |
| 6,083,134 A | 7/2000 | Godlew |
| 6,105,465 A | 8/2000 | Tyson et al. |
| 6,374,701 B1 | 4/2002 | Tittjung |
| 6,394,927 B1 | 5/2002 | Bongard |
| 6,463,830 B1 | 10/2002 | Ito et al. |
| 6,491,126 B1 | 12/2002 | Robison et al. |
| 6,607,062 B1 | 8/2003 | Heatwole et al. |
| 6,688,194 B2 | 2/2004 | Dissett et al. |
| 6,779,420 B2 * | 8/2004 | Peura ................. B60K 23/0808 192/48.1 |
| 6,884,196 B1 | 4/2005 | Ziech |
| 7,104,912 B2 | 9/2006 | Morgensai |
| 7,178,420 B2 | 2/2007 | Barth |
| 7,264,569 B2 | 9/2007 | Fox |
| 7,311,632 B2 | 12/2007 | Dissett et al. |
| 7,361,115 B2 | 4/2008 | Morgensai |
| 7,823,711 B2 | 11/2010 | Uhler et al. |
| 7,874,954 B2 | 1/2011 | Dissett et al. |
| 8,051,744 B2 * | 11/2011 | Bawks .................. F16H 48/142 74/650 |
| 8,146,458 B2 * | 4/2012 | Radzevich ............ F16H 48/145 74/650 |
| 8,231,493 B2 * | 7/2012 | Radzevich ............ F16H 48/145 475/231 |
| 8,256,593 B2 * | 9/2012 | Kato ....................... F16D 25/02 192/35 |
| 2003/0066386 A1 | 4/2003 | Dissett et al. |
| 2004/0237689 A1 | 12/2004 | Hiltbrand |
| 2005/0288144 A1 | 12/2005 | Wang et al. |
| 2008/0060474 A1 | 3/2008 | Mizukawa et al. |
| 2008/0103008 A1 | 5/2008 | Gleasman et al. |
| 2008/0176703 A1 | 7/2008 | Hoberg |
| 2008/0190240 A1 | 8/2008 | Dissett et al. |
| 2009/0011890 A1 | 1/2009 | Bawks |
| 2010/0113208 A1 | 5/2010 | Haugeberg |
| 2010/0276243 A1 | 11/2010 | Arhab et al. |
| 2011/0021304 A1 | 1/2011 | Radzevich |
| 2011/0021306 A1 | 1/2011 | Radzevich |
| 2014/0162828 A1 | 6/2014 | Creager |
| 2014/0171252 A1 | 6/2014 | Creager |

FOREIGN PATENT DOCUMENTS

| | | |
|---|---|---|
| EP | 0 838 612 A2 | 4/1998 |
| EP | 1 767 817 A1 | 3/2007 |
| EP | 1 898 124 A2 | 3/2008 |
| FR | 769 239 | 8/1934 |
| FR | 2 382 627 A1 | 9/1978 |
| WO | WO 2005/111471 A1 | 11/2005 |
| WO | WO 2014/085554 A1 | 6/2014 |

* cited by examiner

COLLAPSIBLE CLUTCHING DIFFERENTIAL

CROSS-REFERENCE TO RELATED APPLICATION

The present application claims the benefit of U.S. Provisional Patent Application Ser. No. 61/727,990, filed Nov. 19, 2012, which application is hereby incorporated by reference in its entirety.

BACKGROUND

1. Field Teachings

The present teachings relate to, generally, a clutching differential and, more particularly, such a differential that is collapsible upon itself during installation thereof into a corresponding housing.

2. Description of the Related Art

A locking differential of the type contemplated by the present teachings is employed as a part of a drive train of a vehicle to control torque and generally includes a pair of clutch members supported in a housing (or casing). A pair of side gears is splined for rotation to corresponding axle half-shafts. A clutch mechanism is interposed between the clutch members and side gears. A cross-pin is operatively mounted for rotation with the housing and received in a pair of opposed grooves formed on inwardly facing surfaces of the clutch members. In an event requiring differential rotation between the axle half-shafts, such as cornering, the higher-speed axle half-shaft advances its clutch to an over-running condition, decoupling it from the torque. If driving terrain provides insufficient fraction to activate the over-running condition of the differential or while driving in a straight line, the torque is applied equally to both axle half-shafts.

A clutching (or locking) type of the differential is generally employed in a four-wheel-drive vehicle or the like, thereby permitting rugged off-road operation of the vehicle. This type of differential is well-known in the aftermarket as a retrofit unit. More specifically, the differential can be retrofitted into an existing conventional housing, such as an original-equipment housing, of the drive train.

The housing for a differential can be "one-piece" or "two-piece." For instance, since the height (dimension that is defined along the rotational axis and can be described also as the "length" or "width") of the differential can be substantial, most original-equipment housings are two-piece to allow the differential to be assembled/installed in or inserted into a first piece of a particular housing before the second piece of the housing is reunited with the first piece to, thereby, enclose the differential. Typically, however, an "open" type of the differential is designed to be employed with one-piece housings. Unfortunately, the height of the retrofit of the gearless clutching differentials of the type commonly known in the related art are often too great for the unit to be assembled/installed into the one-piece housings.

SUMMARY

One aspect of the present disclosure relates to a clutching differential that is adapted to be assembled/installed or inserted into a one-piece housing. In certain examples, clutching differentials in accordance with the principles of the present disclosure are adapted for use in retro-fit applications for installation in existing original-equipment differential housings that have already been installed in a vehicle. This allows exiting differentials such as open differentials to be upgraded to locking differentials. In other examples, clutching differentials in accordance with the principles of the present disclosure can be used in first-fit applications (i.e., installed as original equipment) and may be used in one-piece or multiple piece differential housings.

Another aspect of the present disclosure relates to a clutching differential that is collapsible in an axial direction (i.e., along the axis of rotation of the differential) to facilitate loading the differential into a housing such as a one piece differential housing. In certain examples, the differential is movable in an axial orientation between an extended state and a collapsed state. In certain examples, the differential can be easily loaded into a differential housing while in the collapsed state, and then is axially expanded to the extended state once loaded in the differential housing. In certain examples, the clutching differential has side hubs (i.e., side gears) that axially overlap one another when the differential is in the collapsed configuration. In certain examples, the side hubs can have castellated portions that axially overlap one another when the differential is in the collapsed state. In certain examples, the differential includes clutch mechanisms that are actuated by clutch members to cause torque to be transferred between the clutch members and the side hubs. In certain examples, the differential includes a cross-shaft that rotates with the differential housing and that fits between the clutch members. In certain examples, the cross-shaft is inserted into a groove defined between the clutch members. In certain examples, the cross-shaft is positioned between the castellated ends of the side gears.

Another example of the present disclosure relates to a differential that allows for reduction of the height of the differential when it is assembled/installed or inserted into the housing.

The present teachings further include a collapsible clutching differential for use in a drive train of a vehicle to control torque. The drive train includes at least one rotating member defining an axis of rotation of the rotating member; a housing operatively supported in driven relationship with respect to a remainder of the drive train, adapted to rotate about the axis, and defining a cavity of the housing into which the rotating member extends; and at least one cross-pin mounted for rotation with the housing. The differential includes a pair of side gears disposed in the cavity of the housing, supported for rotation about the axis relative to the housing, and having a torque-transmitting connection to the rotating member. The side gears are adapted to be spaced from each other and collapse upon themselves such that the differential collapses upon itself.

In this way, the collapsible clutching differential of the present teachings is adapted to be assembled/installed or inserted into a one-piece housing. This is because it allows for reduction of the height of the differential when it is assembled/installed or inserted into the housing. This feature is facilitated by the fact that the internal components of the collapsible clutching differential of the present teachings do not include bevel gears.

To this end and in one aspect of the present teachings, the present teachings include castellated gears that are disposed on respective sides of the differential and allow for reduction of the height of the internal components when it is assembled/installed or inserted into the housing. This feature of the present teachings makes it particularly adapted to be marketed as a retrofit unit, but is also applicable to first-fit applications.

BRIEF DESCRIPTION OF THE DRAWINGS

Other aspects of the present teachings are readily appreciated as the same becomes more understood while the subsequent detailed description of at least one aspect of the differential is read taken in conjunction with the accompanying drawing thereof wherein.

DETAILED DESCRIPTION

One representative example of a collapsible clutching differential of the type contemplated by the present teachings is generally indicated at 10 throughout the figures, where like numerals are used to designate like structure. The differential 10 is designed to be employed as a part of a drive train for any suitable vehicle having a power plant that is used to provide motive force to the vehicle—for example, an automotive vehicle. More specifically, the differential 10 is designed to be employed as an aftermarket clutching differential retrofitted into a one-piece housing of a four-wheel-drive vehicle or the like.

Figure 1:
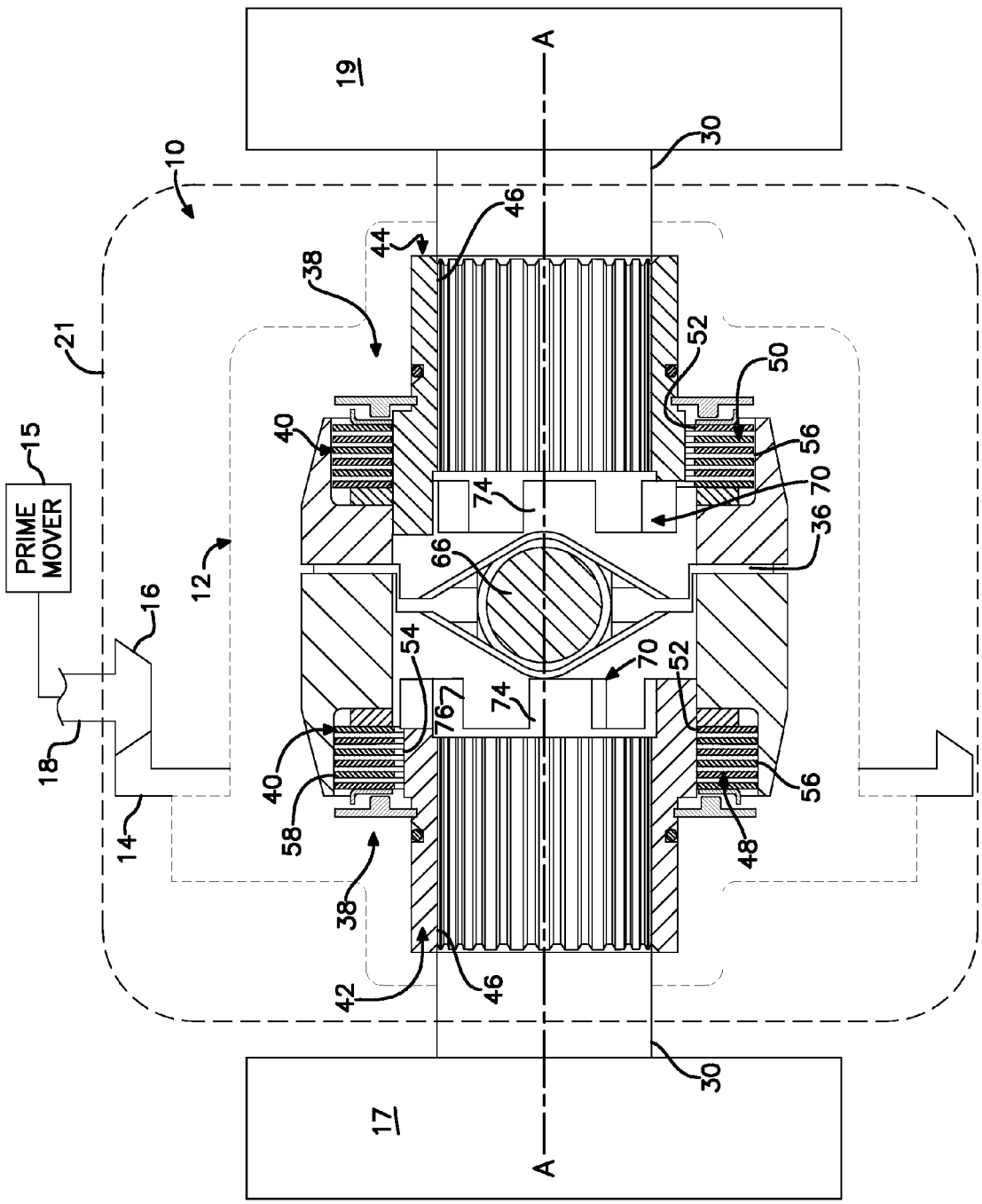
FIG. 1 is a cross-sectional side view of a collapsible locking differential of the present teachings illustrating a drive shaft, pinion gear and ring gear of a drive train.

FIG. 1 illustrates an axle assembly incorporating the differential 10. The axle assembly is part of a drive train used to transfer torque from a prime mover 15 (e.g., an engine, a motor, or like power source) to left and right wheels 17, 19. The differential 10 includes a differential housing 12 (i.e., a differential case) and a differential mechanism 38 (i.e., a differential torque transfer arrangement) positioned within the differential housing 12. The differential housing 12 carries a gear 14 (e.g., a ring gear) that intermeshes with a drive gear 16 driven by a driveshaft 18 of the drivetrain. The differential mechanism 38 is configured to transfer torque from the differential housing 12 to left and right half axle half shafts 30, 32 (i.e., rotating members) that respectively correspond to the left and right wheels 17, 19. The differential 10 is enclosed within an axle housing 21 that protects the differential 10 and contains lubricant (e.g., oil) for lubricating moving parts within the axle housing 21. The differential housing 12 is mounted to rotate relative to the axle housing 21 about an axis of rotation A. In one example, bearings can be provided between the differential housing 12 and the axle housing 21 to allow the differential housing 12 to freely rotate about the axis of rotation A relative to the axle housing 21. The left and right axle half shafts 30, 32 are co-axially aligned along the axis of rotation A.

In certain examples, the axle assembly can be incorporated into a vehicle such as an all-terrain vehicle, a light utility vehicle, or other type of vehicle. The differential 10 of the axle assembly is configured to prevent individual wheel spin and to provide enhanced traction performance on a variety of surfaces such as mud, wet pavement, loose dirt and ice. In use, torque for rotating the differential housing 12 about the axis of rotation A is provided by the drive gear 16 that intermeshes with the ring gear 14 carried by the differential housing 12. The differential mechanism 38 includes left and right clutches (e.g., disc style clutches) configured to transfer torque from the rotating differential housing 12 to the left and right axle half shafts 30, 32 thereby driving rotation of the left and right wheels 17, 19. When the vehicle is driven straight, the left and right clutches are both actuated such that torque from the differential housing 12 is transferred equally to the left and right axle shafts 30, 32. When the vehicle turns right, the left clutch is de-actuated while the right clutch remains actuated. In this state, the differential mechanism 38 continues to drive rotation of the right axle shaft 32 while the left axle shaft 30 is allowed to free wheel at a higher rate of rotation than the right axle shaft 32. When the vehicle makes a left turn, the right clutch is de-actuated while the left clutch remains actuated. In this state, the differential mechanism 38 continues to drive rotation of the left axle shaft 30 while the right axle shaft 32 is allowed to free wheel at a higher rotational speed than the left axle shaft 30.

Figure 6:
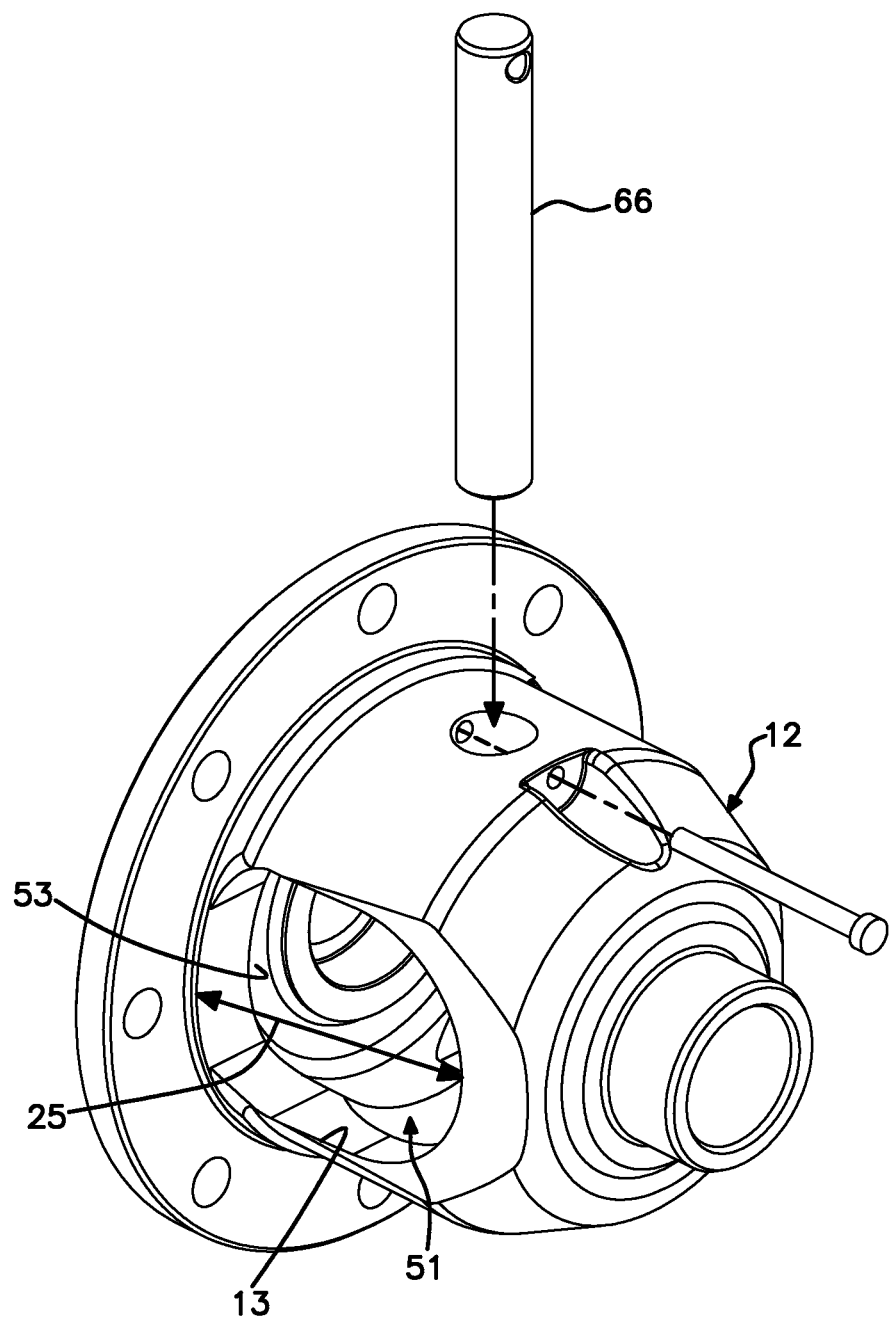
FIG. 6 illustrates an example one-piece differential housing suitable for receiving the collapsible differential of FIG. 2.

It will be appreciated that the differential housing 12 can also be referred to as a differential carrier, a ring gear carrier, a carrier, a differential casing, or like terms. Also, the axle housing 21 can be referred to as a carrier housing, a service housing or like terms. An example housing 12 having a one-piece construction is depicted at FIG. 6. The housing 12 defines a side opening 13 for allowing the differential mechanism 38 to be loaded into the housing 12 while the differential mechanism 38 is in a collapsed state. Once the differential mechanism 38 has been loaded into the housing 12, the differential mechanism 38 can be axially expanded along the axis A from the collapsed state to an extended state. In the extended state, the differential mechanism 38 is secured within the housing 12 and has an axial length that is longer than a corresponding axial dimension 25 of the side opening 13.

It should be appreciated by those having ordinary skill in the related art that, in light of the disclosure that follows, the housing 12 may be defined by any conventional structure known in the related art and the housing of the present teachings is not limited to the housing shown in the figures. Similarly, it should also be appreciated that the housing 12 may be driven by any conventional drive mechanism known in the related art and the housing of the present teachings is not limited to a housing that is driven via a ring gear, pinion gear, and drive shaft.

The drive train of the vehicle includes at least one of the rotating member, but typically includes a pair of rotating members (such as a front axle shaft and rear axle shaft or a pair of axle half-shafts 30, 32). The axle half-shafts 30, 32 define the axis of rotation "A" of the axle half-shafts 30, 32. The housing 12 supports the axle half-shafts 30, 32 and defines a cavity 51 that receives the differential mechanism 38. The housing 12 can also define pockets 53 in the cavity 51. The pockets 53 are aligned along the axis A and are configured for receiving side hubs/side gears of the differential mechanism 38 when the differential mechanism 38 is in the axially extended configuration.

The differential mechanism 38 includes a pair of clutch members (e.g., left and right clutch members 40) disposed in spaced axial relationship with respect to one another. The clutch members 40 are operatively supported for rotation with the housing 12. Left and right side gears 42, 44 are each operatively adapted for rotation with a corresponding one of the left and right axle half shafts 30, 32. To this end, the side gears 42, 44 each define a plurality of splines 46 on the inner circumference thereof that are matingly received in corresponding splines defined on their corresponding axle half shafts 30, 32. The side gears 42, 44 fit within the pockets 53 of the housing 12 when the differential mechanism 38 is in the axially extended state. Left and right clutch mechanisms 48, 50 are operatively disposed between the clutch members 40 and their corresponding side gears 42, 44. When actuated, the clutch mechanisms 48, 50 are configured to transfer torque from the clutch members 40 to their respective side gears 42, 44 so as to resist or prevent relative rotation about the axis of rotation A between the clutch members 40 and their respective side gears 42, 44. The side gears 42, 44 include a plurality of splines 52 on the outer circumference thereof. The clutch mechanisms 48, 50 include a plurality of friction disks 54 that are cooperatively splined to the outer circumference of the side gears 42, 44 and are rotatable therewith. Similarly, each of the clutch members 40 includes a plurality of splines 56 formed on the inner circumference thereof. A series of plates 58 have outer splines that engage the splined inner circumference 56 of the left and right clutch members 40. The plates 58 are interleaved between the friction disks 54 supported on the side gears 42, 44. The plates 58 and the friction discs 54 form clutch packs. The clutch members 40 are axially moveable within the housing 12 to engage/actuate their respective clutch mechanism 48, 50 by axially compressing together the plates 58 and friction discs 54 (i.e., the clutch packs). When the clutch mechanisms 48, 50 are actuated, torque is transferred from the clutch members 40, through the clutch packs to the side gears 42, 44 and their corresponding axle half shafts 30, 32. When both clutch mechanisms 48, 50 are fully actuated, the housing 12, the clutch members 40, the side gears 42, 44 and the axle half shafts 30, 32 all rotate in unison with each other about the axis of rotation A. One representative example of the locking differential 10 of the type contemplated by the present teachings may also employ a plurality of biasing members (not shown) to pre-load the clutch packs. Also, thrust washers may be provided at inboard and outboard sides of the clutch packs.

The clutch members 40 present inwardly directed faces 62 (i.e., inboard sides) that face toward a cross shaft or pin 66 mounted between the clutch members 40. The clutch members 40 also include outwardly directed faces 63 (i.e., outbound sides) that face away from the pin 66. The inwardly directed faces 62 of the clutch members 40 oppose each other and are disposed in spaced axial relationship to one another. Each of the inwardly directed faces 62 of the clutch members 40 includes a groove 64 disposed in facing relationship with respect to the other. The cross pin 66 is received in the grooves 64 and is operatively connected for rotation with the housing 12 about the axis A. The cross pin 66 is generally cylindrical in shape and has an aperture 68 extending radially therethrough at one end. Opposite ends of the cross pin 66 can fit within corresponding radial openings defined by the housing 12 and the aperture 68 allows the cross pin 66 to be pinned in place relative to the housing 12 to prevent the cross pin 66 from sliding along its axis relative to the housing 12. The grooves 64 are defined at the inwardly directed faces 62 of the clutch members 40. Each groove 64 is defined by ramp surfaces 65 that converge toward a neutral position 67. The neutral positions 67 form the deepest portions of the grooves 64. The clutch members 40 can rotate a limited amount relative to the cross pin 66 about the axis A between actuated positions where the cross pin 66 engages (e.g., rides on) the ramp surfaces 65 and non-actuated positions where the cross pin 66 is offset from the ramp surfaces 65 and aligns with the neutral positions 67. Each groove 64 includes two groove portions 64a, 64b positioned on opposite sides of the axis A.

Each grove portion 64a, 64b includes a forward ramp 65F and a rearward ramp 65R separated from one another by the neutral position 67. During normal forward driving conditions, the cross pin 66 engages the forward ramp surfaces 65F to force the clutch members 40 axially outwardly thereby actuating the clutch mechanisms 48, 50. During normal rearward driving conditions, the cross pin 66 engages the rear ramp surfaces 65R to force the clutch members 40 axially outwardly thereby actuating the clutch mechanisms 48, 50.

When the cross pin 66 is aligned with the neutral positions 67 of the grooves 64 of one of the clutch members 40, the corresponding clutch pack 59 is not axially compressed by the corresponding clutch member 40 and is therefore not actuated. When the clutch pack is not actuated by its corresponding clutch member 40, only pre-load is applied to the clutch pack. In this non-actuated state, the clutch plates and the friction discs can rotate relative to one another during a wheel overspeed condition. Thus, during a wheel overspeed condition, the non-actuated clutch pack corresponding to the overspeeding wheel permits the corresponding side gear 42, 44 and its corresponding axle half shaft 30, 32 to rotate relative to the corresponding clutch member 40.

During normal straight driving conditions, the cross pin 66 engages the ramp surfaces 65 causing actuation of the clutch mechanisms 48, 50 such that the clutch packs prevent relative rotation between the clutch members 40 and their corresponding side gears 42, 44. Thus, driving torque is transferred from the differential housing 12 and cross pin 66 through the clutch members 40, the clutch packs and the side gears 42, 44 to the axle half shafts 30, 32 and the wheels 17, 19. Thus, with both clutch packs actuated, the differential housing 12, cross pin 66, the clutch members 40, the side gears 42, 44, the axle half shafts 30, 32 and the wheels 17, 19 all rotate in unison about the axis A. During an overspeed condition (e.g., during a turn), the clutch member 40 corresponding to the overspeeding wheel rotates relative to the cross pin 66 such that the cross pin 66 disengages from the ramp surfaces 65 and becomes aligned with the neutral positions 67 thereby causing the corresponding clutch pack to no longer be actuated. With the clutch pack no longer actuated, only pre-load pressure is applied to the corresponding clutch pack. The pre-load pressure is sufficiently low that the de-actuated clutch permits relative rotation between the clutch member 40 and its corresponding side gear 42, 44 to accommodate the faster rotation of the overspeeding wheel relative to its corresponding clutch member 40, the cross pin 66 and the differential housing 12. An intermating stop arrangement 100 defined between the inboard sides of the clutch members 40 allows for only a limited range of relative rotational movement between the clutch members 40 about the axis A. The stop arrangement 100 ensures that the clutch members 40 don't over-rotate their corresponding neutral positions 67 past the cross pin 66 during an overspeed condition. If the clutch members 40 were to over-rotate during an overspeed condition, the cross pin 66 would inadvertently actuate a de-actuated clutch by engaging the ramp 65L, 65R on the opposite side of the neutral position 67. The stop arrangement 100 prevents this from happening thereby allowing the overspeeding wheel to maintain an overspeed condition during a turn without interference from the clutch mechanisms 42, 44.

It should be appreciated by those having ordinary skill in the related art that the differential 10 can be employed in any suitable application, as original equipment, in a two-piece housing, and in any suitable vehicle. It should also be appreciated that the rotating member 30, 32 can be any suitable rotating member.

Figure 2:
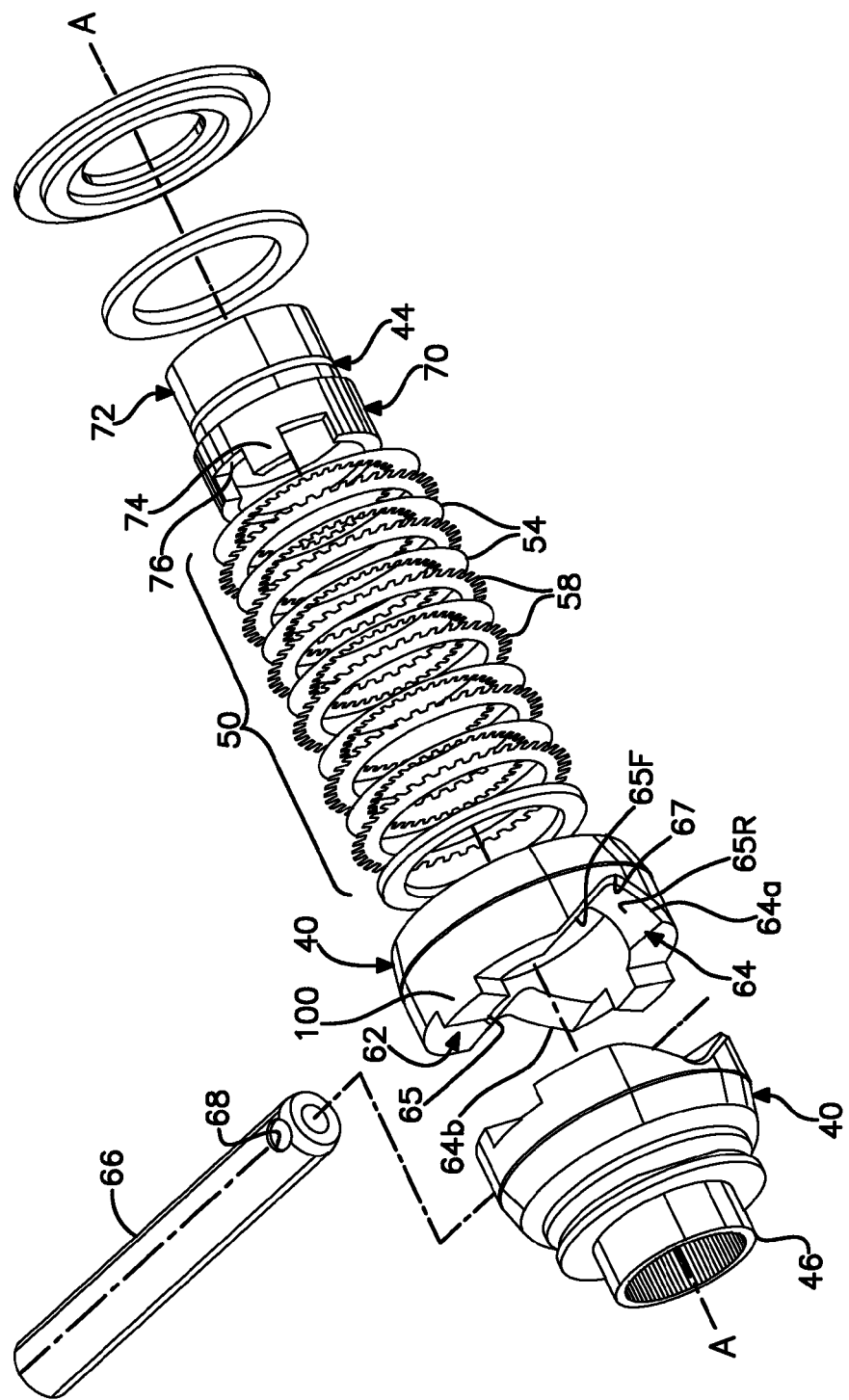
FIG. 2 is an exploded perspective view of the collapsible clutching differential of FIG. 1.

The side gears 42, 44 are disposed in the cavity of the housing 12 (only one castellated side gear 44 being shown in FIG. 2). The castellated side gears 42, 44 are supported for rotation about the axis of rotation "A" relative to the housing 12 and have a torque-transmitting connection to the axle half-shafts 30, 32 extending into the housing 12. The side gears 42, 44 have castellated inboard ends configured to allow the castellated side gears 42, 44 to be spaced from each other and to collapse upon themselves such that the differential 10 collapses upon itself. In an aspect of the differential 10, the castellated side gears 42, 44 are moved along the axis of rotation "A" manually. However, those having ordinary skill in the related art should appreciate that the castellated side gears 42, 44 can be moved along the axis of rotation "A" by any suitable means and in any suitable manner.

To this end, each of the castellated side gears 42, 44 defines a castellated portion, generally indicated at 70, and hub portion, generally indicated at 72. The castellated portions 70 of the castellated side gears 42, 44 are adapted to collapse upon themselves, as explained in greater detail below.

More specifically, the castellated portions 70 are adapted to meshingly engage with each other. In particular, a side of each of the castellated portions 70 disposed opposite the corresponding hub portion 72 (as shown in FIG. 2) defines a series of teeth 74 and spaces 76 that alternate with respect to each other. The teeth 74 (and spaces 76) are disposed substantially entirely about a circumference of the castellated portion 70 and extend substantially parallel with the axis of rotation "A" in a direction toward the cross-pin 66 (away from the hub portion 72). The teeth 74 are disposed substantially parallel and substantially uniform with respect to each other, and the spaces 76 are also substantially uniform with respect to each other. The shape and size of each of the teeth 74 and spaces 76 are substantially equivalent with respect to each other. Moreover, in the aspect illustrated herein, each of the teeth 74 and spaces 76 is substantially rectangular and extends substantially half of an entirety of the height of the corresponding castellated portion 70.

When the castellated side gears 42, 44, in general, and castellated portions 70, in particular, are brought into contacting relationship with each other, the teeth 74 of one of the castellated portions 70 is mated with the spaces 76 of the other castellated portion 70. In this operative mode, the height of the mated castellated portions 70 becomes substantially less than that of a sum of each of the castellated portions 70. For example, the height of the mated castellated portions 70 can be about three-fourths that of such sum. In any event, when this meshing or mating takes place, the castellated portions 70 collapse upon themselves such that the castellated side gears 42, 44 collapse upon themselves and, in turn, the differential 10 collapses upon itself.

A retaining ring clip or other structure can be used holds each of the side gears 42, 44 in an "installed" position. More specifically, the retaining ring clips can hold the side gears 42, 44 in the "expanded" position to prevent the castellation from binding on the cross-shaft 66 after assembly during operation of the differential. The retaining ring clip can lies just outboard of an outer thrust washer. In an example, the retaining ring clip can be disposed in a pocket on an inner diameter of an inner spacer or elsewhere and can assist in axially retaining the side gears 42, 44 in the extended axial orientation relative to the housing 12.

It should be appreciated by those having ordinary skill in the related art that each of the castellated side gears 42, 44 can have any suitable shape, size, and structure and structural relationship with the remainder of the drive train, including the housing 12 and axle half-shafts 30, 32. It should also be appreciated that the castellated side gear 42, 44 can be supported for rotation and have a torque-transmitting connection to the axle half-shafts 30, 32 in any suitable manner. Similarly, the castellated side gears 42, 44 can meshingly engage with each other in any suitable manner such that the castellated side gears 42, 44 can collapse upon themselves and, in turn, the differential 10 can collapse upon itself.

Each of the castellated and hub portions 70, 72 can have any suitable shape, size, and structure and structural relationship with the remainder of the drive train, including each other. The castellated portion 70 can define any suitable number of teeth 74 and spaces 76. It should also be appreciated that each of the teeth 74 can have any suitable shape, size, and structure and structural relationship with remainder of the drive train, including the spaces 76 and each other of the same castellated portion 70 or the castellated portion 70 of the other castellated side gear 42, 44.

The friction disks 54 are adapted to rotate with the housing 12 while the plates 58 are splined to the hub portion 72 of the corresponding castellated side gear 42, 44 such that the friction disks 54 and plates 58 are disposed in an alternating fashion with respect to each other. The clutch mechanism 48, 50 can be fastened, fitted, or locked to the housing 12 and hub portion 72 in any suitable manner.

The differential 10 may be pre-assembled and self-contained before the differential 10 is installed into the housing 12. Upon such installation, the cross-pin 66 extends transversely across the housing 12 substantially perpendicular to the axis "A." The cross-pin 66 is retained in the housing 12 in any suitable manner.

Figure 3:
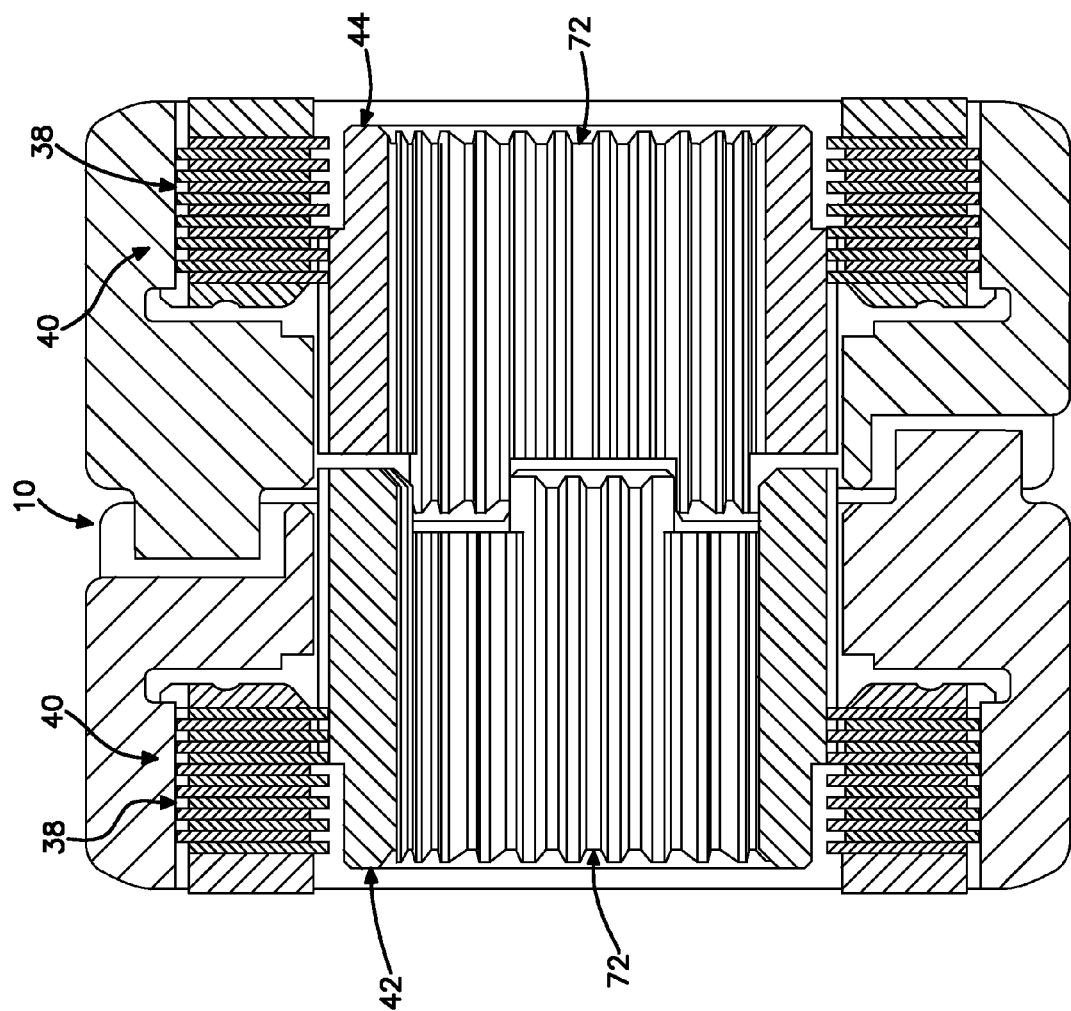
FIG. 3 is a sectional side view of the aspect of the collapsible clutching differential of the present teachings shown in FIG. 2 illustrating the differential disposed in a "collapsed" state.
Figure 4:
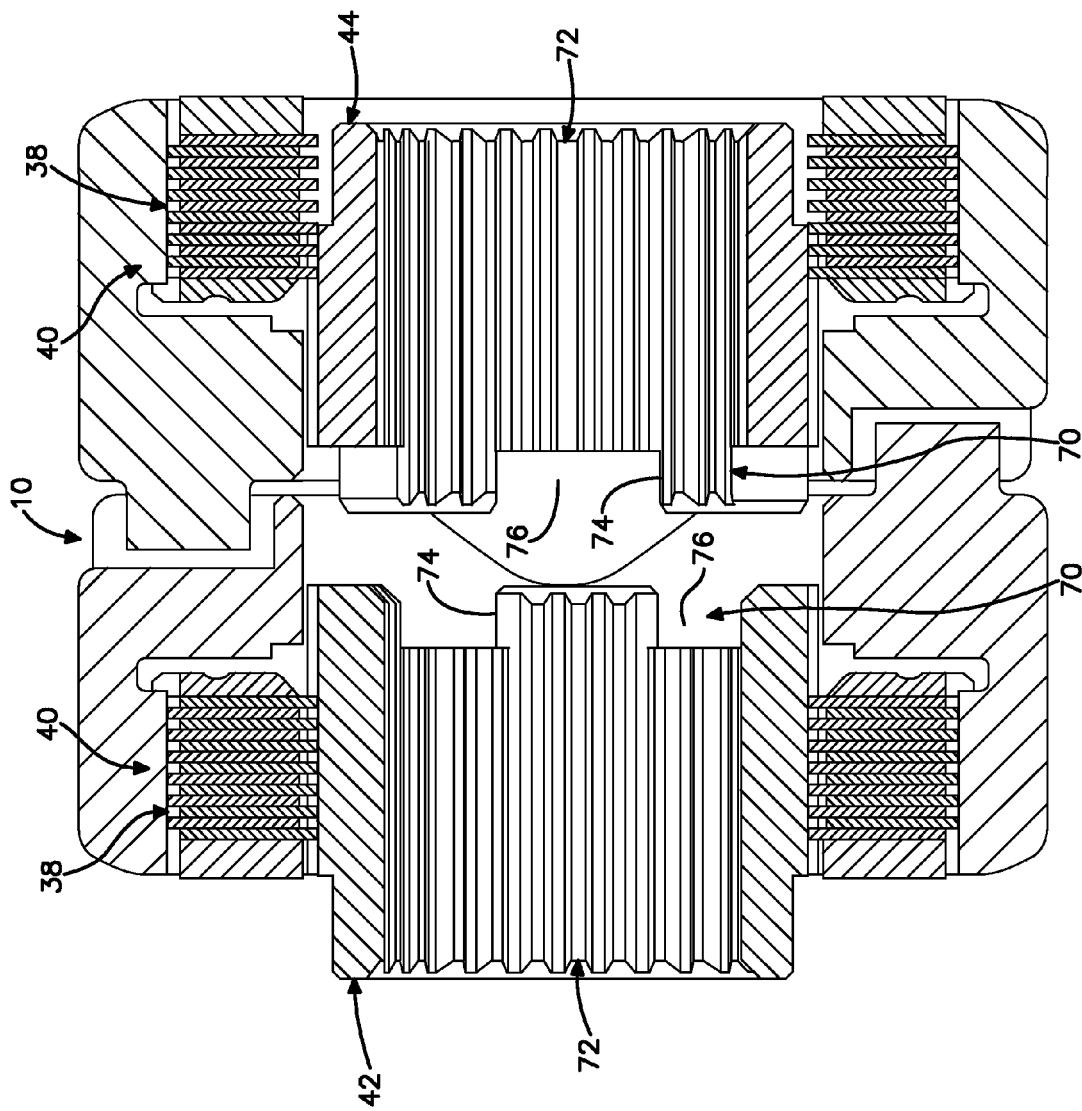
FIG. 4 is a sectional side view of the aspect of the collapsible clutching differential of the present teachings shown in FIG. 2 illustrating the differential disposed in a "collapsing" state (i.e., a partially collapsed state)
Figure 5:
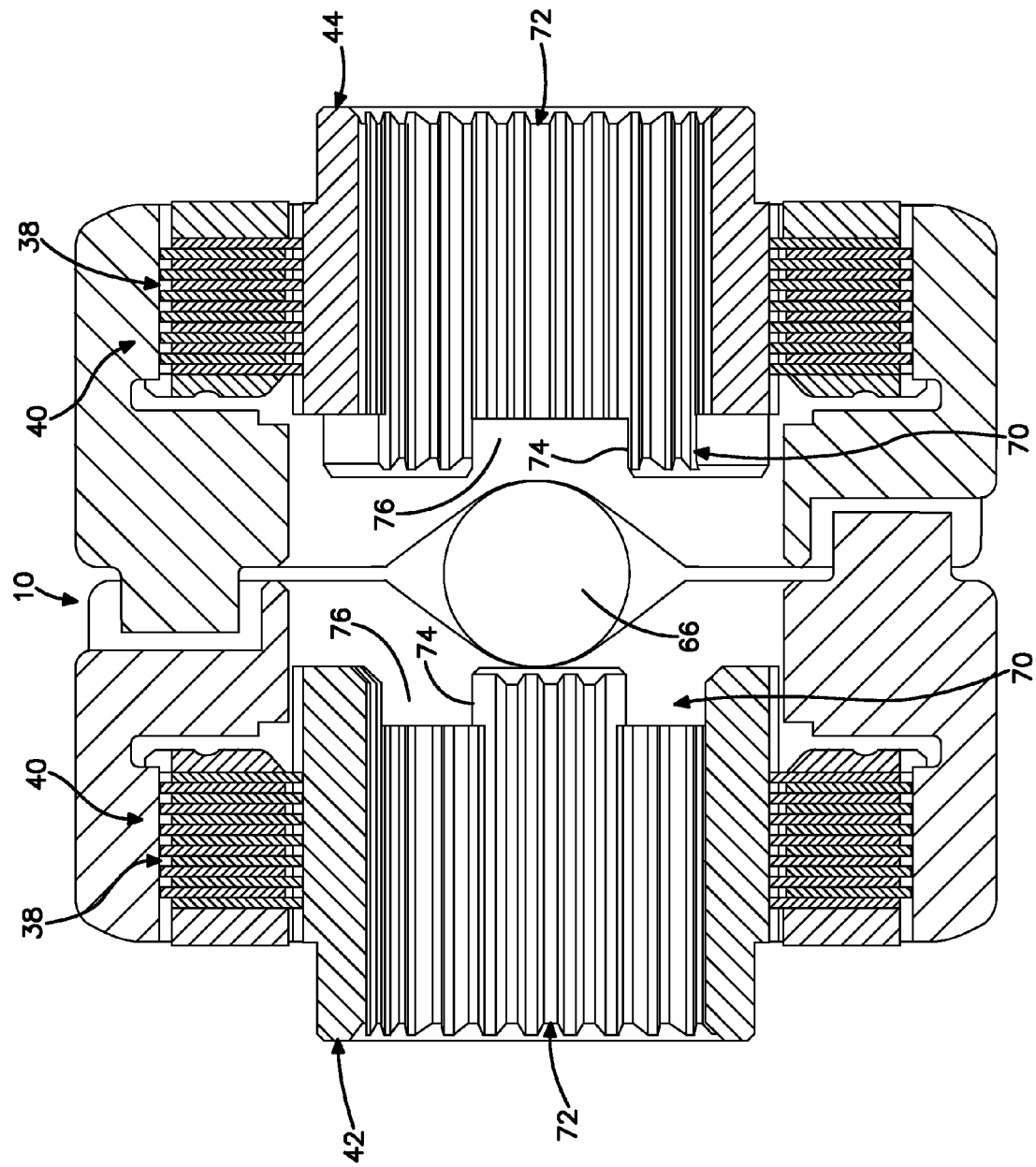
FIG. 5 is a sectional side view of the aspect of the collapsible clutching differential of the present teachings shown in FIG. 2 illustrating the differential disposed in an "inserted/installed" state (i.e., an axially extended state)

In its operative mode, as best shown in FIGS. 3 through 5, the differential 10 can be disposed in either a "collapsed" state, a "collapsing" state, or an "inserted/installed" state. In the extended state of FIG. 5, the height of the differential 10 (i.e., the length defined along the axis A) is substantially greater than that of the side opening 13 of the one-piece housing 12 such that the differential 10 cannot be inserted/installed into the housing 12. The extended state is shown at FIG. 5. In the extended state, a sufficient gap exists between the side gears 42, 44 to allow the cross-pin 66 to pass thereinbetween. To properly insert/install the differential 10 into the housing 12, the height of the differential 10 must be reduced.

To accomplish this, the castellated side gears 42, 44, in general, and castellated portions 70, in particular, are brought into contacting relationship with each other such that the teeth 74 of one of the castellated portions 70 is mated with the spaces 76 of the other castellated portion 70. In this way, the castellated portions 70 are meshingly engaged with each other such that the castellated side gear 42, 44 collapse upon themselves (see FIG. 3). In this "collapsed" state of the differential 10, the height/length of the mated castellated portions 70 along the axis A is reduced vis-à-vis that of the sum of each of the castellated portions 70 such that the height/length of the castellated side gears 42, 44 and, in turn, differential 10 is reduced. At this point, the height/length of the differential 10 is lesser than that of the axial length of the side opening 13 of the housing 12 such that the differential 10 can be inserted/installed into the housing 12. To reach the collapsed state, the cross-pin 66 cannot be positioned between the side gears 42, 44.

In the "collapsing" state of the differential 10 and as shown in FIG. 4, the castellated side gears 42, 44 are, say, manually being brought out of contacting relationship with each other such that the castellated side gears 42, 44, in general, and castellated portions 70, in particular, are being spaced from each other. At this point, the cross-pin 66 cannot be disposed between them.

In the "inserted/installed" state of the differential 10 as shown in FIG. 5, the castellated side gears 42, 44 are, say, manually brought out of contacting relationship with each other such that the castellated side gears 42, 44, in general, and castellated portions 70, in particular, are spaced from each other such that the cross-pin 66 is disposed between them. When the differential 10 is inserted/installed into the housing 12 and expanded, the height/length of the differential 10 is greater than that of the axial length of the side opening 13 of the housing 12. Those having ordinary skill in the related art should appreciate that the castellated side gears 42, 44 can be brought out of contacting relationship with each other, in general, and manually so, in particular, in any suitable manner. Once the differential 10 is extended, the hub portion 72 of the side gears 42, 44 can fit within the internal pockets 53 of the housing 12.

The differential 10 is adapted to be assembled/installed in or inserted into the one-piece housing 12. Also, the differential 10 allows for reduction of the height of the differential 10 when the differential 10 is assembled/installed in or inserted into the housing 12. Furthermore, the internal components of the differential 10 do not include bevel gears. In addition, the differential 10 includes the castellated side gears 42, 44, which are disposed on respective sides of the differential 10 and allow for reduction of the height of the internal components of the differential 10 when the differential 10 is assembled/installed in or inserted into the housing 12. Moreover, the differential 10 can be marketed as a retrofit unit.

The present teachings have been described in great detail in the foregoing specification, and it is believed that various alterations and modifications of the many aspects of the present teachings will become apparent to those ordinary skilled in the art from a reading and understanding of the specification. It is intended that all such alterations and modifications are included in the present teachings insofar as they come within the scope of the appended claims.

The following is a list of reference numerals used in the disclosure:
10 collapsible clutching differential;
12 housing (casing);
13 side opening;
14 ring gear;
15 prime mover;
16 bevel gear;
17, 19 wheels;
18 shaft;
21 housing;
25 axial dimension;
30, 32 rotating members (axle half-shafts);
38 differential mechanism;
40 clutch members;
42, 44 castellated side gears;
46 splines;
48, 50 clutch mechanisms;
51 housing cavity;
52 splines;
53 pockets;
54 friction disks;
56 splines;
58 plates;
62 face;
64 groove;
64a, 64b groove portions;
65 ramp surface;
64F forward ramp;
64R rearward ramp;
66 cross-shaft or cross-pin;
67 neutral position;
68 aperture;
70 castellated portion;
72 hub portion;
74 teeth;
76 spaces;
100 stop arrangement; and
"A" axis of rotation.

What is claimed is:

1. A collapsing differential mechanism configured to fit within a differential housing, the collapsing differential mechanism comprising:
    side hubs for transferring torque to axle half shafts, the side hubs being aligned along an axis of rotation, the side hubs having inboard ends and outboard ends;
    clutch members aligned along the axis of rotation;
    clutch packs for transferring toque between the clutch members and the side hubs when the clutch packs are actuated, wherein the clutch members move axially along the axis of rotation to cause actuation of the clutch packs; and
    the side hubs being movable along the axis of rotation relative to the clutch packs and the clutch members between a collapsed state and an extended state, wherein the inboard ends of side hubs axially overlap one another when the side hubs are in the collapsed state, and wherein the inboard ends are axially spaced-apart when the side hubs are in the extended state.

2. The collapsing differential of claim 1, wherein the side hubs include internal splines that mate with corresponding splines of the axle half shafts.

3. The collapsing differential of claim 1, wherein the inboard ends of the side hubs are castellated.

4. The collapsing differential of claim 1, wherein the inboard ends of the side hubs mate with one another when the side hubs are in the collapsed state.

5. The collapsing differential of claim 1, further comprising a cross-shaft that fits between the clutch members and also fits between the side hubs.

6. A method for installing the collapsing differential mechanism of claim 1 in the differential housing, the method comprising:
    arranging the differential mechanism in the collapsed state;
    inserting the differential mechanism into the differential housing while the differential mechanism is in the collapsed state; and
    expanding the differential mechanism from the collapsed state to the extended state while the differential mechanism is in an interior of the differential housing.

7. The method of claim 6, wherein the differential housing is a one-piece housing, and wherein the differential mechanism is inserted into the interior of the differential housing through a side opening of the differential housing.

8. The method of claim 7, wherein the side opening has an axial length that is less than an extended length of the differential mechanism and that is larger than a collapsed length of the differential mechanism.

9. A collapsing differential mechanism configured to fit within a differential housing, the collapsing differential mechanism comprising:
    side hubs for transferring torque to axle half shafts, the side hubs being aligned along an axis of rotation, the side hubs having inboard ends and outboard ends;
    clutch members aligned along the axis of rotation;

a cross-pin that fits between the clutch members and between the side hubs when the differential mechanism is assembled;

clutch packs for transferring toque between the clutch members and the side hubs when the clutch packs are actuated, wherein the clutch members move axially along the axis of rotation to cause actuation of the clutch packs; and the side hubs being movable along the axis of rotation relative to the clutch packs and the clutch members between a collapsed state and an extended state, wherein the inboard ends of side hubs are spaced sufficiently far apart to allow the cross-pin to fit thereinbetween when the side hubs are in the extend state, and wherein the cross-pin cannot fit between the inboard ends of the side hubs when the side hubs are in the collapsed state.

10. The collapsing differential of claim 9, wherein the inboard ends of the side hubs overlap each other when the side hubs are in the collapsed state.

11. The collapsing differential of claim 9, wherein the side hubs include internal splines that mate with corresponding splines of the axle half shafts.

12. The collapsing differential of claim 9, wherein the inboard ends of the side hubs are castellated.

13. The collapsing differential of claim 10, wherein the inboard ends of the side hubs mate with one another when the side hubs are in the collapsed state.

14. A method for installing the collapsing differential mechanism of claim 9 in the differential housing, the method comprising:

arranging the differential mechanism in the collapsed state;

inserting the differential mechanism into the differential housing while the differential mechanism is in the collapsed state; and expanding the differential mechanism from the collapsed state to the extended state while the differential mechanism is in an interior of the differential housing.

15. The method of claim 14, wherein the differential housing is a one-piece housing, and wherein the differential mechanism is inserted into the interior of the differential housing through a side opening of the differential housing.

16. The method of claim 15, wherein the side opening has an axial length that is less than an extended length of the differential mechanism and that is larger than a collapsed length of the differential mechanism.

* * * * *